Figure 1:
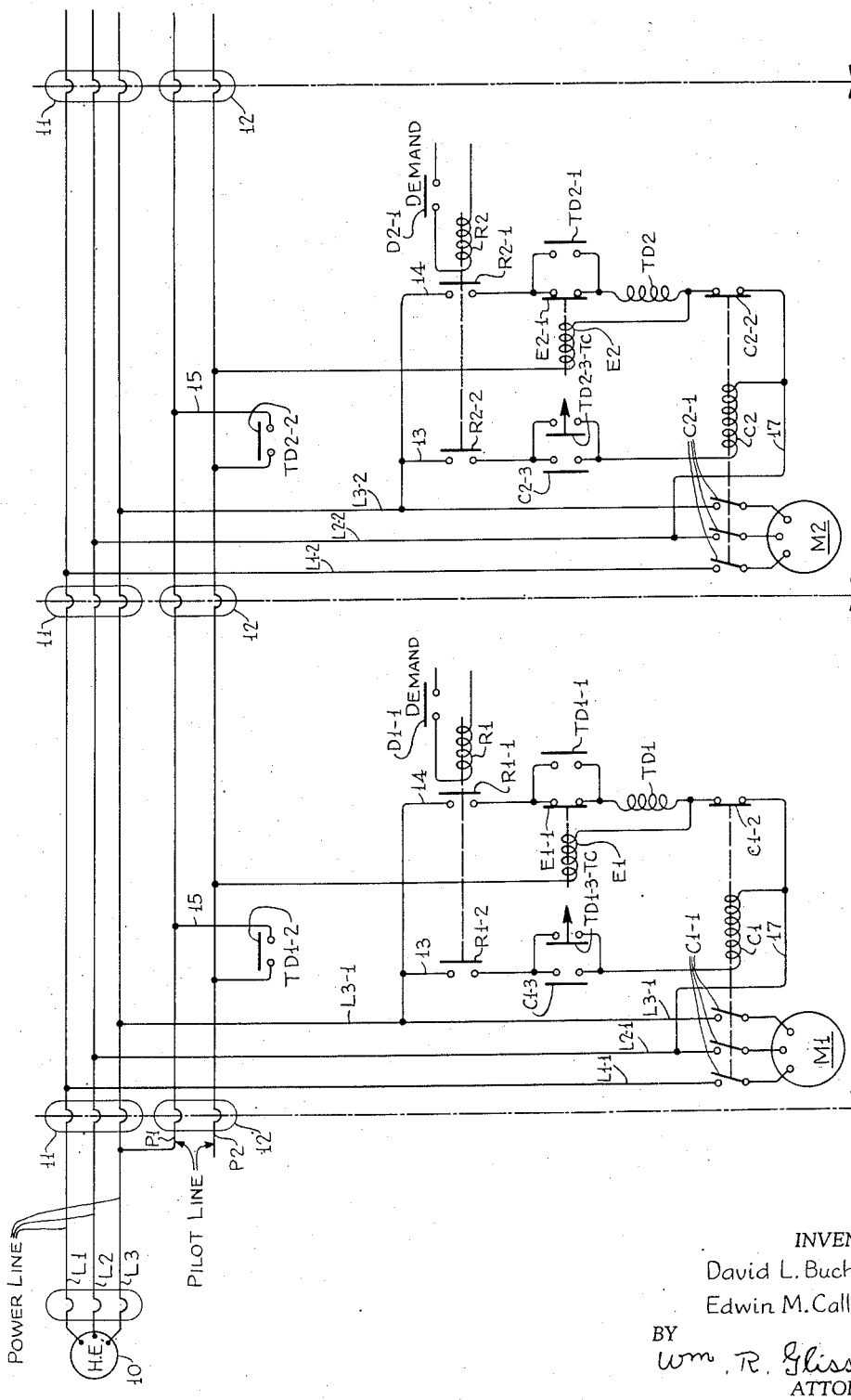

INVENTORS
David L. Buchanan
Edwin M. Callender
BY
Wm. R. Glisson
ATTORNEY

INVENTORS
David L. Buchanan
Edwin M. Callender
BY
Wm. R. Glisson
ATTORNEY

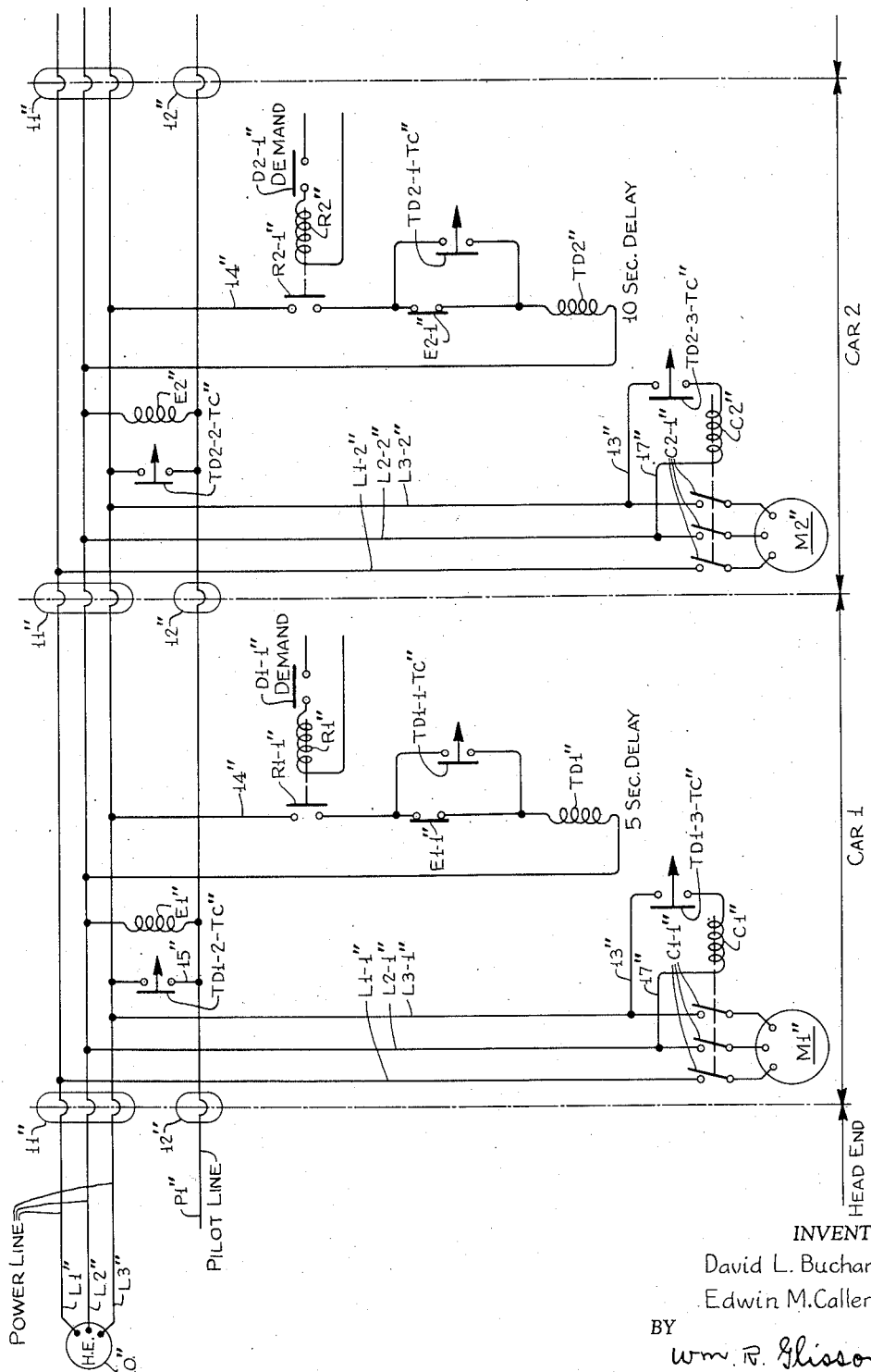

United States Patent Office 2,831,982
Patented Apr. 22, 1958

2,831,982
MEANS FOR LIMITING LOADS ON MULTIPLE UNIT POWER DEMAND CIRCUITS

David L. Buchanan, Whitemarsh, and Edwin M. Callender, Cynwyd, Pa., assignors to The Budd Company, Philadelphia, Pa., a corporation of Pennsylvania Application January 23, 1956, Serial No. 560,559

8 Claims. (Cl. 307—35)

This invention relates to means for limiting loads on multiple unit power demand circuits, especially for coupled vehicles, and has for an object the provision of improvements in this art.

There are many installations where a power supply unit is required to serve a number of power consuming units which individually have a demand well within the capacity of the power supply unit but which collectively have a demand above the capacity of the supply unit, the consuming units having the further characteristic that they require only an intermittent rather than a steady supply of power. The excess demand may exist only during a short starting time while each consuming unit is being cut in, as in some lighting or motor circuits, or may be absolute, as when a large refrigerating or heating unit must be operated to a point of satisfaction but for a much shorter time than the total time that power from the supply unit is available.

Heretofore in the control of power to separate demand units, it has been the practice to provide a separate control line or pair of lines from the supply unit to each demand unit. In a coupled train of cars this is an unsatisfactory situation for the reason either that the supply unit must be of adequate capacity to supply all demand units simultaneously, as is usual but unduly expensive in the large size of power supply unit required, or that pilot control lines and couplings must be provided which have a variable number of pilot line wires depending on the number of cars that are coupled in a train. This means that each car must carry not only its own pilot line wire or wires, but enough through-running wires to serve all other cars that may be coupled in the train, and also that the couplings must be correspondingly comprehensive. The result has been either that excessively large head end power supply units have been used or that each car has been supplied with its own individual power supply unit.

According to the present invention there is provided, in connection with a main power line, a pilot line which regulates the supply of current from a main power source unit to a plurality of demand units in accordance with the condition of a demand unit which first obtains a connection with the power source, the control being transmitted through a common pilot line, having not more than two wires, to response elements associated respectively with the several demand units.

Figure 2:
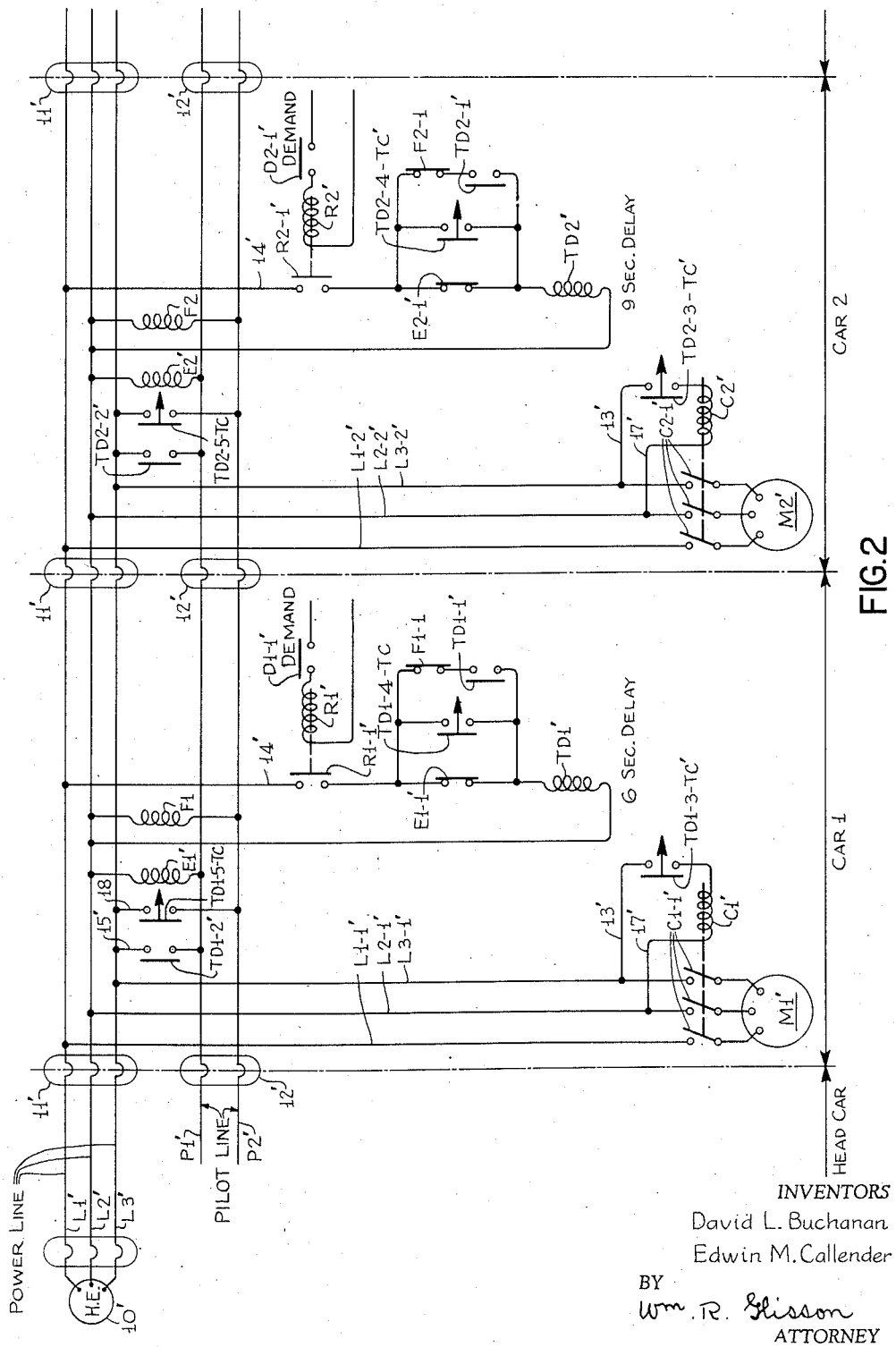

The invention will be described by reference to the accompanying drawings, wherein:

Fig. 1 is a wiring diagram of a power and control circuit, as of an industrial installation or a multi-unit train, in which the supply of current to one unit holds off the supply of current to other units until power has been supplied to the first unit;

Fig. 2 is a wiring diagram of a power and control circuit, as of an industrial installation or a multi-unit train, in which the supply of current to any unit holds off the supply of current to all other units until the first unit is satisfied, and in which, in the event of the simultaneous demand of a plurality of units, the unit with the shortest time delay will start; and Fig. 3 is a wiring diagram of a power and control circuit, as of an industrial installation or a multi-unit train, in which the control is similar in effect to that of the Fig. 2 embodiment but in which a simpler system is used.

Referring first to the circuit of Fig. 1, the several units are shown, by way of example, as cars of a train, the units being designated as "Head end," "Car 1," "Car 2," etc., by legends at the bottom of the figure.

A power source or supply unit 10, such as a generator, a battery, or both, is carried by the head end unit, current being conducted from the supply unit to the several demand units or cars in the train by a power line having conductors or wires L1, L2, and L3. Between units the wires are connected by couplings 11, here denoted by a loop surrounding the three individual line connections.

A pilot circuit or line here comprises two line wires P1 and P2, one of the pilot wires, as P1, being connected to one of the power wires, as L3, by a permanent connection and the pilot wires being connected between cars by couplings 12, denoted by a loop around the several individual connections.

On each car there is a demand control D1–1, D2–1, etc., such as a thermostat switch, for example, which when closed will energize a demand relay R1, R2, etc. to close its switch contacts R1–1, R1–2 or R2–1, R2–2, etc. in branch wires 13 and 14 from power wire L3.

Closure of relay switch R1–1 in wire 14 causes a time-delay relay TD1 to be energized. This relay has a number of contact switches TD1–1, TD1–2, and TD1–3–TC (TC meaning a time delay in closing).

Switch TD1–1 is normally open and in series with switch R1–1 and in parallel with a switch E1–1, to be described presently. Switch TD1–2 is normally open and located in a jumper wire 15 between pilot wires P1 and P2 and when closed applies current to wire P2. Switch TD1–3–TC is normally open and located in the branch wire 13 leading to a switch operating solenoid coil or relay C1, thence by a wire 17 and a wire L2–1 to power wire L2.

When pilot wire P2 is energized by closure of switch TD1–2, it energizes a hold-off relay E1, E2, etc. for each car to open switches E1–1, E2–1, etc. in series with switches R1–1, R2–1, etc. and in parallel with switches TD1–1, TD2–1, etc.

For car 1 the opening of switch E1–1 has no effect because switch TD1–1 in parallel with it has been closed, but for all other cars the opening of this E switch (E2, etc.) prevents the application of current to these other cars because the parallel switches, TD2–1, etc., are open so that the closure of the demand relay switches, R2–2, etc., will have no effect.

After a time delay, switch TD1–3–TC will close to energize solenoid coil C1 which will close its gang switch C1–1 in branch power wires L1–1, L2–1, L3–1 and energize the demand unit for car 1, which is here represented as a motor M1.

When coil C1 is energized, it also locks itself in circuit by its switch C1–3 past parallel switch TD1–3–TC in branch wire 13 so that when TD1–3–TC opens again it will have no effect and coil C1 will remain energized between branch power wires L2–1 and L3–1 until the demand relay switch R1–2 in branch wire 13 opens (when the demand switch D1–1 opens).

Energization of coil C1 also opens a switch C1–2 in the branch wire 14 and deenergizes relays E1 and TD1.

When relay TD1 is deenergized, it opens its switch TD1–2 to take current off pilot line wire P2 to deenergize the hold-off relays E2, etc. of other cars and to permit any car demanding power to receive it.

In operation, then, when a demand unit, such as car 1, requires power, its demand switch D1-1 will close and this will shortly cause time delay switch TD1-2 to close and this will energize pilot wire P2 and the lock-out or hold-off relays E2, etc. of all other cars so that they cannot receive power until power has been applied to car 1 and the switch TD1-2 reclosed.

Power remains on in car 1 until demand switch D1-1 opens and causes relay switch R1-2 to be opened to cut power off the demand unit M1.

When any other car demands power, the action will be the same as described above for car 1, all cars except the one first making the demand being denied power until the first has had power applied. The short pause provided for the closure of the time delay switch TD1-3-TC assures that the hold-off relays, E2, etc., have had time to operate before power is applied on the selected demand unit.

Two pilot wires P1 and P2 are shown and provide certain circuit safety provisions and a latitude in permissible equipment, but one wire alone is adequate. For example, the wire P1 may be omitted if in each car the wire 15 is carried to one of the wires, as L3, of the power line.

The Fig. 2 embodiment is similar in general purpose to the first embodiment but departs therefrom in two details. First, the Fig. 2 embodiment provides preferential or selective supply of current to the various demand units so there will be little chance that they will all demand current at the same instant; and, second, the non-selected units are denied current until the demand of the first unit is satisfied.

As before, there is a power line with conductors or wires L1', L2', L3', a pilot line with conductors P1', P2', demand switches D1-1', D2-1', etc., demand relays R1', R2', etc., relay switches R1-1', R2-1', etc., and power demand units M1', M2', etc., with power controlling solenoids C1', C2', etc., with switches C1-1', C2-1', etc., in branch power lines comprising conductors L1-1', L2-1', L3-1', or L1-2', L2-2', L3-2', etc.

In the wires 14' having the demand relay switches R1-1', R2-1', etc., there are respectively arranged time delay relays TD1', TD2', etc. which have separate delay settings, for example, the relay TD1' having a delay time of six seconds, relay TD2' having a delay time of nine seconds, and so on.

Time delay relay TD1' has contact switches TD1-1', TD1-2', TD1-3-TC', TD1-4-TC and TD1-5-TC, and the relays TD2', etc. of other demand units have corresponding contact switches.

Switch TD1-1' is a self-holding or lock-in switch in one of three parallel branch circuit wires in wire line 14' having the demand relay switch R1-1'. Switch TD1-2' is in a wire 15' from power wire L3' to pilot wire P1'. Switch TD1-3-TC' is in the wire 13' to power switch solenoid C1', wire 17' being the return from C1' to branch power wire L2-1'. Switch TD1-4-TC is in another parallel branch wire in the wire line 14'. Switch TD1-5-TC is in a wire 18 from power wire L3' to the second pilot wire P2'.

When switch TD1-2' is closed, it enegizes pilot line wire P1', which may be referred to as the instantaneous pilot line wire, and this energizes all of the hold-off relays E1', E2', etc. of the several cars or demand units, these relays opening their switches E1-1', E2-1' in a parallel line wire in the line wire 14'.

In operation, if, by the time the hold-off E relay switch, E1-1', etc., opens for any demand unit, its time delay relay, TD1', etc., has not been energized to close its switch TD1-1', etc., then this time delay relay cannot be energized.

Closure of switch TD1-3-TC', after a time delay, applies power to the demand unit M1'.

Closure of switch TD1-4-TC, after a time delay, closes a gap in another parallel wire in wire 14' and keeps the time delay relay TD1' energized even if the other two parallel wires should be opened. The operation of switch E1—1' has already opened one of the three parallel branch wires.

Closure of switch TD1-5-TC, after a time delay, energizes the pilot wire P2', which may be referred to as the delay pilot line wire, and this energizes a secondary hold-off relay F1, F2, etc. at each demand unit, these relays opening their switches F1-1, F2-1, etc. which are in series with the lock-in switches TD1-1', TD2-1', etc. of one of the parallel branch wires. Now, even if a time delay relay of a demand unit has been energized by the closure of its demand relay switch R1-1', etc. and has closed its lock-in switch TD1-1', etc., it will be de-energized if it has not had time to close its time delay switch TD1-4-TC. This assures that if several units demand power at the same time, the unit having the time delay relay with the shortest time delay will cause the other units having slower relays to be cut out of circuit. Such a situation could occur, for example, when a head end power source, such as a locomotive, is coupled to a train of cars requiring power for air conditioning.

The Fig. 3 embodiment, as stated above, functions much like the Fig. 2 embodiment, but with less equipment.

There is a power line with conductors or wires L1", L2", L3", a pilot line with conductor P1", demand switches D1-1", D2-1", etc., demand relays R1", R2", etc., relay switches R1-1", R2-1", etc., and power demand units M1", M2", etc., with power controlling solenoids C1", C2", etc., with switches C1-1", C2-1" in branch power lines comprising conductors L1-1", L2-1", L3-1", or L1-2", L2-2", L3-2", etc.

In the wires 14" having the demand relay switches R1-1", R2-1", etc., there are respectively arranged time delay relays TD1", TD2", etc., which have separate delay settings, for example, the relay TD1" having a delay time of five seconds, relay TD2" having a delay time of ten seconds, and so on.

Time delay relay TD1" has contact switches TD1-1-TC", TD1-2-TC", and TD1-3-TC", and the relays TD2", etc. of the other demand units have corresponding contact switches.

Switch TD1-1-TC" is a self-holding or lock-in switch in one of two parallel branch circuit wires in wire 14' having the demand relay switch R1-1". Switch TD1-2-TC" is in a wire 15" from power wire L3" to pilot wire P1". Switch TD1-3-TC" is in the wire 13" to power switch solenoid C1", wire 17" being the return from C1" to branch power wire L2-1".

When switch TD1-2-TC" is closed after a time delay, it energizes pilot line wire P1" and this energizes all of the hold-off relays E1", E2", etc. of the several cars or demand units, these relays opening their switches E1-1", E2-1", etc. in a parallel line wire in the line wire of 14".

In operation, if, by the time the hold-off E relay switch E1-1", etc. opens for any demand unit, its time delay relay switch, TD1-1-TC", etc., has not been closed, the energization of the demand R relay of that demand unit will be ineffective and the closure of the delay relay switch TD1-2-TC, TD2-2-TC, etc. of some other demand unit, by a faster operation of its time delay relay, will energize the pilot line P1" and cause the hold-off E relays to open the make circuit wire at switch E1-1", E2-1", etc., so that the units with slower relays cannot receive current until the unit with the fastest is satisfied.

It is thus seen that improved means are provided for limiting loads on multiple demand units so that a relatively small power supply unit can adequately serve all of the demand units and with few pilot or control wires so that simple standard connections can be used for a plurality of units no matter how many such units may be coupled in series.

While certain embodiments of the invention have been specifically described for purposes of illustration, it is to

What is claimed is:

1. Means for limiting loads on multiple unit power demand circuits, comprising in combination, a power supply unit, a power line from said supply unit, a plurality of power demand units adapted to be connected with said power line, a demand control element for each demand unit, a pilot control line, means at each demand unit for energizing said pilot control line after its demand control element has called for power, and power cut-off means at each demand unit which includes an element which is energized when said pilot line is energized for holding off the supply of power for all except the one unit which energizes said pilot control line when the said one unit is connected with the power line.

2. Apparatus as set forth in claim 1, which includes, for each demand unit, a time delay relay having a contact switch in a connecting branch line around said power cut-off means to the main power line.

3. Apparatus as set forth in claim 1, which includes, for each demand unit, a time delay relay having a contact switch in a branch line from the pilot control line to the main power line.

4. Apparatus as set forth in claim 1, which includes, for each demand unit, a power control element which causes deenergization of the pilot line so that other units may receive power after the predetermined needs of the demand unit which received power have been satisfied.

5. Apparatus as set forth in claim 1, which includes, for each unit, relay means for establishing an immediate and a delayed energization to said pilot line to first hold off power to all demand units which have not received a demand signal and, after a time delay, to hold off power to all demand units which have received a demand signal but which do not actually connect with the power line before one demand unit has established a connection to the power line.

6. Apparatus as set forth in claim 1, characterized by the fact that, at each demand unit, a time delay means is provided which causes the deenergization of the pilot line and the operation of other units after power has been supplied to one demand unit.

7. Apparatus as set forth in claim 1, characterized by the fact that, at each demand unit, means are provided for deenergizing the pilot line and permitting operation of other units after the demand control element of one unit has been satisfied.

8. Means for limiting loads on a power supply unit serving a plurality of power demand units, comprising in combination, a power supply unit, a plurality of power demand units, a power supply line extending from said power supply unit to locations for supplying said power demand units, a power demand control element for each power demand unit, a pilot control line extending to locations for connection to said power demand units, said pilot control line being normally de-energized, means at each power demand unit for energizing the pilot control line when the power demand control element calls for power, and cut-out means at each power demand unit which is energized when the pilot control line is energized for holding off the supply of power for all execept the one unit which energizes said pilot control line when the said one unit is connected with the power line, the pilot line energizing means at each power demand unit being a time delay device, the time delay device for each power demand unit being arranged to act at a different delay time from that of the time delay devices of the other power demand units.

References Cited in the file of this patent

UNITED STATES PATENTS

| 1,802,751 | Bryson | Apr. 28, 1931 |
| 2,153,247 | Hamilton | Apr. 4, 1939 |
| 2,231,052 | Bryson | Feb. 11, 1941 |